United States Patent
Chang et al.

(10) Patent No.: US 11,095,828 B2
(45) Date of Patent: Aug. 17, 2021

(54) VIDEO SIGNAL CONVERSION DEVICE AND METHOD THEREOF

(71) Applicant: AVerMedia TECHNOLOGIES, INC., New Taipei (TW)

(72) Inventors: Wen-Chien Chang, New Taipei (TW); Yen-Cheng Yao, New Taipei (TW)

(73) Assignee: AVerMedia TECHNOLOGIES, INC., New Taipei (TW)

( * ) Notice: Subject to any disclaimer, the term of this patent is extended or adjusted under 35 U.S.C. 154(b) by 0 days.

(21) Appl. No.: 16/373,590

(22) Filed: Apr. 2, 2019

(65) Prior Publication Data

US 2019/0335082 A1    Oct. 31, 2019

(30) Foreign Application Priority Data

Apr. 30, 2018   (TW) .................................. 107114732

(51) Int. Cl.
*H04N 5/235*    (2006.01)
*H04N 7/01*    (2006.01)

(52) U.S. Cl.
CPC ......... *H04N 5/2355* (2013.01); *H04N 7/0117* (2013.01)

(58) Field of Classification Search
CPC ........................... H04N 5/2355; H04N 7/0117
See application file for complete search history.

(56) References Cited

U.S. PATENT DOCUMENTS

| 2014/0247869 A1* | 9/2014 | Su ........................ H04N 19/30 375/240.03 |
| 2016/0142714 A1* | 5/2016 | Toma .................. H04N 21/4402 375/240.25 |
| 2017/0070681 A1* | 3/2017 | Nattress .................... G06T 9/00 |

FOREIGN PATENT DOCUMENTS

| CN | 105981396 A | 9/2016 |
| CN | 106030503 A | 10/2016 |
| CN | 106791865 A | 5/2017 |
| EP | 3254457 A1 | 12/2017 |

* cited by examiner

*Primary Examiner* — Michael E Teitelbaum
(74) *Attorney, Agent, or Firm* — CKC & Partners Co., LLC

(57) ABSTRACT

A video signal conversion device includes a front end interface, a rear end interface, a video detector and a video processor. The front end interface is coupled to a video source to receive an input signal. The rear end interface is coupled to a video receiver. The video detector determines whether the input signal corresponds to HDR imaging format. The video detector generates a conversion command in response to the input signal corresponding to HDR imaging format. The video processor is coupled to the front end interface, the rear end interface and the video detector. When the video processor receives the conversion command, the video processor converts the input signal into an output signal with SDR imaging format. The video processor sends the output signal to the video receiver via the rear end interface.

19 Claims, 4 Drawing Sheets

VIDEO SIGNAL CONVERSION DEVICE AND METHOD THEREOF

CROSS-REFERENCE TO RELATED APPLICATION

This application claims priority to Taiwan Application Serial Number 107114732, filed on Apr. 30, 2018, which is herein incorporated by reference.

BACKGROUND

Technical Field

Present disclosure relates to a conversion device and a method thereof. More particularly, present disclosure provides a system and a method for video signal conversion.

Description of Related Art

Nowadays, many video source devices at the front end can provide image contents in high dynamic range imaging (HDR) format, such as game images from some video game devices (e.g. PS4). However, at the rear end, many industries in the field sometimes fail to provide video receiver that can support the HDR format in many applications, such as recording or displaying. In a case that the video signal coming from the front end is encoded in the HDR format but the rear end fails to support the HDR format, users of the device can see images with abnormal colors caused by the format incompatibility.

In view of foregoing, prior arts can have some deficiencies. Therefore, improvements are required.

SUMMARY

An aspect of present disclosure is to provide a video signal conversion device. The video signal conversion device comprises a front end interface, a rear end interface, a video detector and a video processor. The front end interface is coupled to a video source. The front end interface is configured to receive an input signal sending from the video source. The rear end interface is coupled to a video receiver. The video detector is coupled between the front end interface and the rear end interface. The video detector configured to determine whether the input signal corresponds to a high dynamic range (HDR) imaging format and to generate a conversion command in response to the input signal corresponding to the high dynamic range imaging format. The video processor is coupled to the front end interface, the rear end interface and the video detector. If the video processor receives the conversion command, the video processor is configured to convert the input signal into an output signal corresponding to a standard dynamic range (SDR) imaging format, and send the output signal to the video receiver via the rear end interface.

Another aspect of present disclosure is to provide a video signal conversion method. The video signal conversion method comprises following steps: receiving, by a video detector, an input signal sending from the video source; determining, by the video detector, whether the input signal corresponds to a high dynamic range (HDR) imaging format; in response to the input signal corresponding to the high dynamic range imaging format, generating a conversion command by the video detector; receiving, by a video processor, the conversion command; converting, by the video processor, the input signal into an output signal corresponding to a standard dynamic range (SDR) imaging format; and sending, by the video processor, the output signal to a video receiver.

According to the foregoing, the embodiments of present disclosure provides a video signal conversion device and a video signal conversion method that can be used to solve the problem that the receivers fails to support the high dynamic range imaging format.

DETAILED DESCRIPTION

Figure 1:
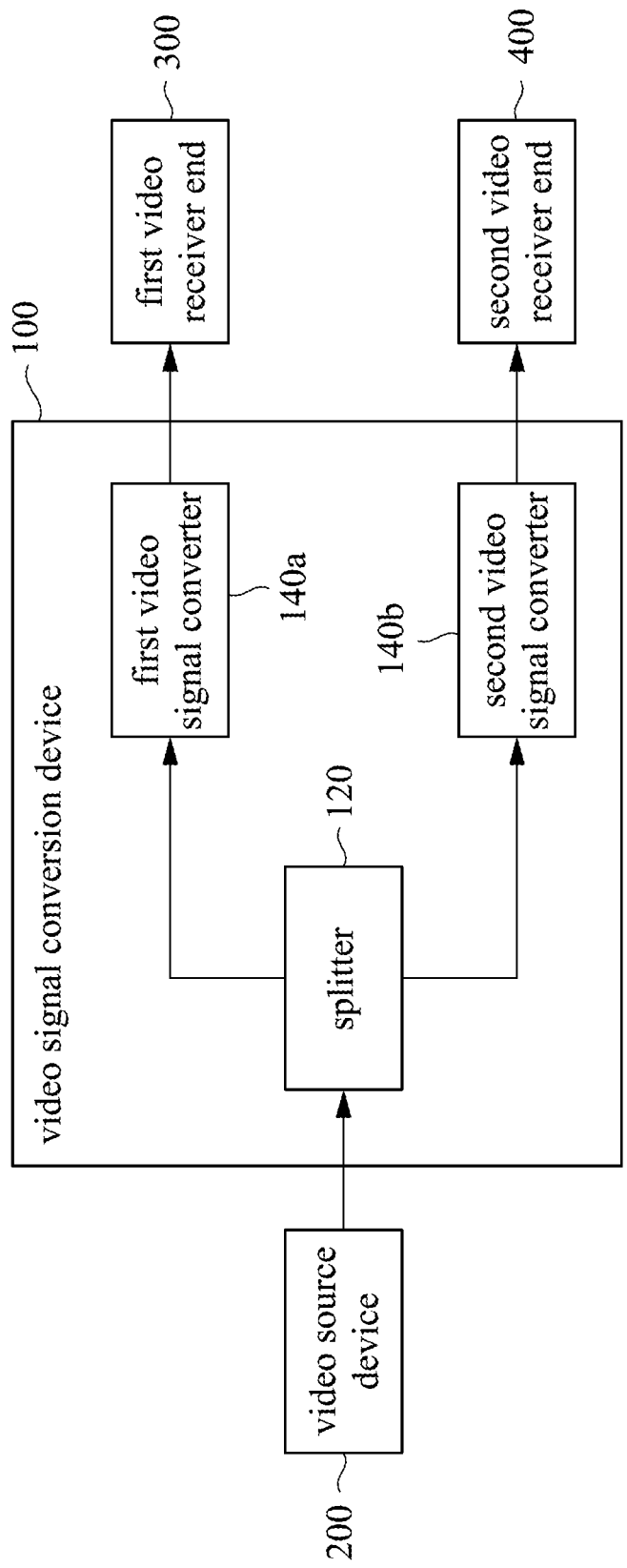
FIG. 1 is a schematic diagram showing a video signal conversion device according to an embodiment of present disclosure.

Reference will now be made in detail to the present embodiments of the disclosure, examples of which are illustrated in the accompanying drawings. Wherever possible, the same reference numbers are used in the drawings and the description to refer to the same or like parts.

The terminology used herein is for the purpose of describing particular embodiments only and is not intended to be limiting of the disclosure. As used herein, the singular forms "a," "an," and "the" are intended to include the plural forms as well, unless the context clearly indicates otherwise.

It will be understood that, although the terms "first," "second," etc., may be used herein to describe various elements, these elements should not be limited by these terms. These terms are used to distinguish one element from another.

In the following description and claims, the terms "coupled" and "connected", along with their derivatives, may be used. In particular embodiments, "connected" and "coupled" may be used to indicate that two or more elements are in direct physical or electrical contact with each other, or may also mean that two or more elements may be in indirect contact with each other. "Coupled" and "connected" may still be used to indicate that two or more elements cooperate or interact with each other.

As used herein, the terms "comprising," "including," "having," and the like are to be understood to be open-ended, i.e., to mean including but not limited to.

As used herein, the term "and/or" includes any and all combinations of one or more of the associated listed items.

Furthermore, relative terms, such as "upper" or "top", "lower" or "bottom", "left", "right", "front" or "rear" may be used herein to describe one element's relationship to another element as illustrated in the Figures. It will be understood that relative terms are to describe various elements, and these elements should not be limited by these terms.

The terms used in this specification generally have their ordinary meanings in the art and in the specific context where each term is used. The use of examples in this specification, including examples of any terms discussed herein, is illustrative only, and in no way limits the scope and meaning of the disclosure or of any exemplified term. Likewise, the present disclosure is not limited to various embodiments given in this specification.

FIG. 1 is a schematic diagram showing a video signal conversion device according to an embodiment of present disclosure. As shown in FIG. 1, in the embodiment, a video signal conversion device 100 includes a splitter 120, a first video signal converter 140a and a second video signal converter 140b. The splitter 120 can be a high definition multimedia interface (HDMI) splitter. The splitter 120 of the video signal conversion device 100 has two ends. The front end of the splitter 120 is electrically coupled to a video source device 200 which can output video signals encoded in high dynamic range (HDR) imaging format. It is understood that the term "high dynamic range imaging" can be abbreviated into "HDR" hereinafter. The rear end of the splitter 120 can be bifurcated into two paths. One of the paths is electrically coupled to the first video signal converter 140a and another is electrically coupled to the second video signal converter 140b. In some embodiments, the rear end of the splitter 120 is coupled to the first video signal converter 140a and the second video signal converter 140b via high definition multimedia interface cables. The video source device 200 is configured to transmit an input signal to the video signal conversion device 100 and the splitter 120 is configured to split the input signal into the two paths. The same input signal can therefore be sent to the first video signal converter 140a and the second video signal converter 140b.

Reference is made to FIG. 1, in the embodiment, a front end of the first video signal converter 140a is coupled to the splitter 120 and a rear end of the first video signal converter 140a is coupled to a first video receiver end 300. In correspondence, a front end of the second video signal converter 140b is coupled to the splitter 120, and a rear end of the second video signal converter 140b is coupled to a second video receiver end 400. In an exemplary embodiment (1), the video source device 200 outputs video signals encoded in the HDR imaging format. The first video receiver end 300 is a display supporting the HDR imaging format, such as 4K HDR television display, etc. The second video receiver end 400 is a display that cannot support the HDR imaging format, such as a normal personal computer display that merely supports standard dynamic range (SDR) imaging format, etc. It is understood that the term "standard dynamic range" can be abbreviated into "SDR" hereinafter.

In the exemplary embodiment (1), each of the first video signal converter 140a and the second video signal converter 140b can determine whether the video signals from the video source device 200 are corresponding to the HDR imaging format and determine whether the first video receiver end 300 and the second video receiver end 400 connected thereto can support the HDR imaging format. When the second video signal converter 140b determines that the video signals from the video source device 200 are corresponding to the HDR imaging format and the second video receiver end 400 fails to support the HDR imaging format, the second video signal converter 140b can convert the HDR video signals from the video source device 200 to SDR video signals and output the SDR video signals to the second video receiver end 400. In this case, the second video receiver end 400 can display correct images according to the input signal. It is noted that, in prior arts, a low-contrast color washout can happen without such conversion. In another case, when the first video signal converter 140a determines that the video signals from the video source device 200 are corresponding to the HDR imaging format and the first video receiver end 300 can support the HDR imaging format, the first video signal converter 140a, the first video signal converter 140a can deliver the video signals in HDR imaging format sending from the video source device 200 to the first video receiver end 300. Since the input and output signals are both in HDR imaging format, the first video signal converter 140a can, for example, pass through the video signals without conversion between the HDR imaging format and the SDR imaging format. In addition, the first video signal converter 140a and the second video signal converter 140b can configured with video recording functions. In this way, the first video signal converter 140a can record the video signals in the HDR imaging format and the second video signal converter 140b can record the video signals in the SDR imaging format.

It is noted that the video receiver in the above embodiment is, for example, a display that can (or cannot) support the HDR imaging format. In an alternative exemplary embodiment (2), the video receiver can be other devices for video applications. For instance, a storage/a streaming device/a live broadcast device or a video editor device o the likes that can (or cannot) support the HDR imaging format. In such embodiment, the first video receiver end 300 and the second video receiver end 400 can have the same (or the different) video functions or the same (or the different) abilities to support the HDR imaging format. The scope of present disclosure is not limited thereto.

In another alternative exemplary embodiment (3), according to the user settings, the video signal converter can only detect whether the front end is corresponding to the HDR imaging format. The video signal converter can ignore whether the rear end supports the HDR imaging format signals. For instance, when the video signals outputting from the video source device 200 is encoded in the HDR imaging format, the converter can convert the HDR video signals from the video source device 200 into video signals corresponding to the SDR imaging format and deliver the video signals to the video receiver for further applications. The applications can be storing the video signals in the SDR imaging format, for example.

It is noted that, in the foregoing embodiments, there are two video signal converters configured in the video signal conversion device 100. However, the configuration of the video signal conversion device 100 is not intended to limit the scope of present disclosure. Adapt to different the video receivers, the video signal conversion device 100 can include different numbers of video signal converters for the video signal conversion device 100 to bifurcate the input signal into the video receivers via the splitter 120. Of course, in some embodiments, the video signal conversion device 100 can be configured with only one video signal converter. For example, to keep the first video signal converter 140a and remove the second video signal converter 140b. In other words, when the video signals sending from the video source device 200 pass the splitter 120, the video signals can be outputted to the second video receiver end 400 directly without passing the second video signal converter 140b. Moreover, in the embodiment, the video signal conversion device 100 is configured with one splitter. But the scope of present disclosure is not limited thereto. Without the splitter, a single video signal converter can still work. In some embodiments, the configuration can be replaced with a plurality of video source devices being connected to a plurality of video signal converter, respectively.

Figure 2:
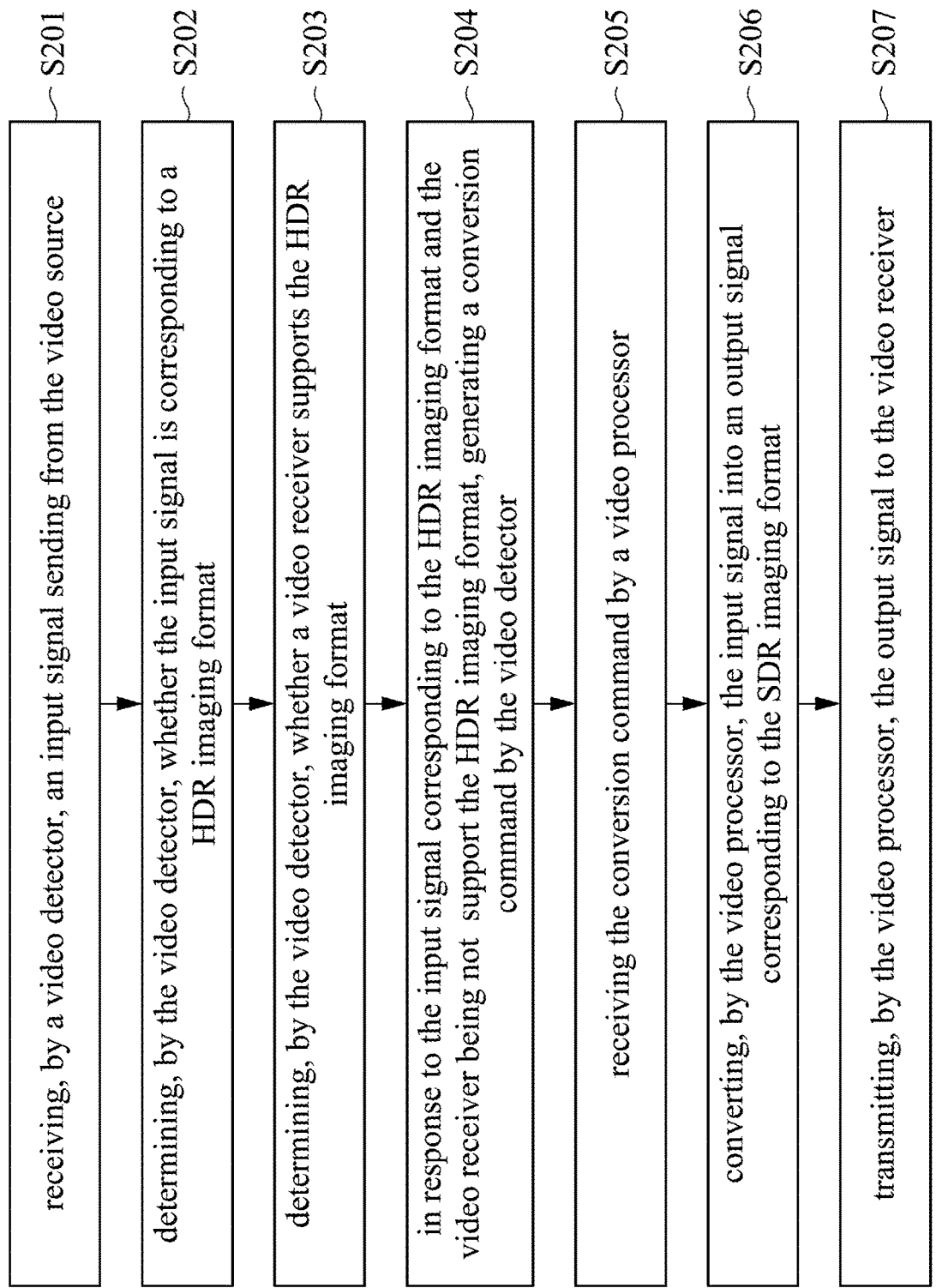
FIG. 2 is a flow chart showing a video signal conversion method according to an embodiment of present disclosure.

FIG. 2 is a flow chart showing a video signal conversion method according to an embodiment of present disclosure. In the embodiment, the video signal conversion method can include steps S201-S207. The steps S201-S207 can be performed by the video signal converters described in the embodiments of FIG. 1. Therefore, the hardware implementation of the video signal conversion method can be referenced to the embodiments of FIG. 1. In the embodiment, details steps of the video signal conversion method will be introduced in following paragraphs.

Figure 3:
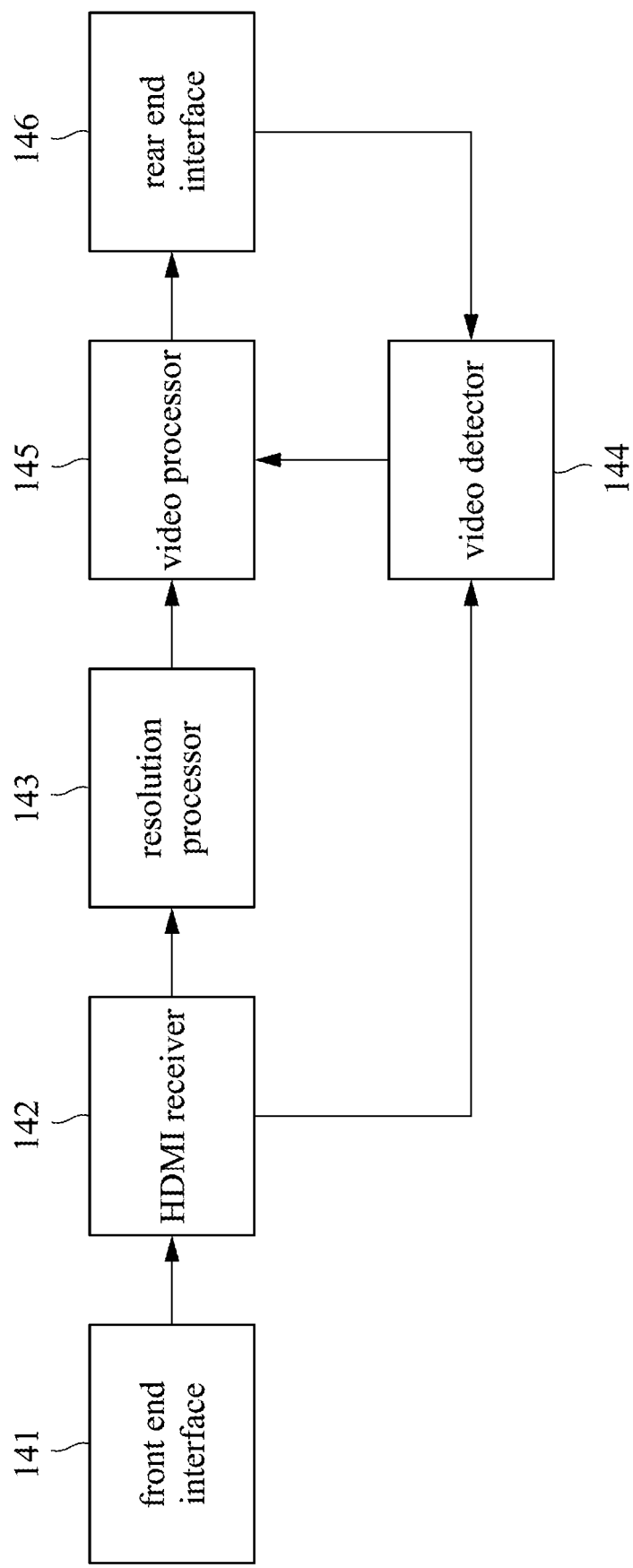
FIG. 3 is a schematic diagram showing a video signal converter according to an embodiment of present disclosure.

To allow for better understandings, reference is made to FIG. 3. FIG. 3 is a schematic diagram showing a video signal converter according to an embodiment of present disclosure. The video signal converters described in the embodiments of FIG. 1 can be established with the structures shown in FIG. 3, but not limited thereto. In the embodiment, the video signal converter can include a front end interface 141, a HDMI receiver 142, a resolution processor 143, a video detector 144, a video processor 145 and a rear end interface 146. The connections among these components are shown in the figure. The front end interface 141, the HDMI receiver 142, the resolution processor 143, the video processor 145 and the rear end interface 146 are connected to form a video passage. The video detector 144 is electrically coupled to the HDMI receiver 142, the video processor 145 and the rear end interface 146.

Step S201: receiving, by a video detector, an input signal sending from the video source. As shown in FIG. 1, when the video source device 200 sends the input signal to the splitter 120, the splitter 120 can split the input signal (e.g. 8 k/4 k HDR signals) into the first video signal converter 140a and the second video signal converter 140b. As shown in FIG. 3, in this way, the front end interface 141 of the first video signal converter 140a and the second video signal converter 140b can receive the input signal and redirect the input signal to the HDMI receiver 142. Next, the HDMI receiver 142 can deliver the input signal to the resolution processor 143 via the image bus so that the resolution processor 143 can process the input signal. It is noted that the resolution processor 143 can be used to convert the input signal into video signals in some specific resolutions according to users demand. In some embodiments, the resolution processor 143 is not a necessary component. Alternatively, the video processor can perform the function of resolution processor 143.

In the embodiment, the video detector 144 of the first video signal converter 140a and the second video signal converter 140b can be a general processor, a master control unit (MCU), a system on a chip (SoC), a field programmable gate array (FPGA), etc. In some embodiments, the video detector 144 can be associated with one or more applications so that the video detector 144 can access corresponding instructions from memories and execute these instructions to perform some functions of the video detector 144.

Step S202: determining, by the video detector, whether the input signal is corresponding to a HDR imaging format. As shown in FIG. 3, the HDMI receiver 142 and the video detector 144 are electrically coupled via a data bus, such as an inter-integrated circuit (I2C) data bus, a universal asynchronous receiver/transmitter (UART) data bus or a serial peripheral interface (SPI) data bus. As mentioned, when the input signal is transmitted to the HDMI receiver 142, the HDMI receiver 142 can extract the at least one video metadata from the input signal, and send the at least one video metadata of the input signal to the video detector 144 via the data bus. Since the at least one video metadata includes imaging format information being used to define the imaging format of the input signal, the video detector 144 can determine whether the input signal is corresponding to the HDR imaging format according to the at least one video metadata.

Step S203: determining, by the video detector, whether a video receiver supports the HDR imaging format. As shown in FIG. 3, the video detector 144 and the rear end interface 146 are electrically coupled via a data bus. The video detector 144, for example, can read the extended display identification data (EDID) information of the first video receiver end 300 and/or the second video receiver end 400. In this manner, the video detector 144 can determine whether the first video receiver end 300 and/or the second video receiver end 400 are the video receivers that can support the HDR imaging format. It is understood that the extended display identification data of the video receiver is merely an example but not a limitation. Alternative information that can be used to determine whether the video receiver can support the HDR imaging format are available (e.g. hardware efficiency or software information).

Step S204: in response to the input signal corresponding to the HDR imaging format and the video receiver being not support the HDR imaging format, generating a conversion command by the video detector. As shown in FIG. 1 and FIG. 3, in the embodiment, the input signal sending from the video source device 200 is encoded in the HDR imaging format. Therefore, the video detector 144 of the first video signal converter 140a and the second video signal converter 140b can confirm that input signal is corresponding to the HDR imaging format according to the at least one video metadata. As shown in FIG. 1, in the exemplary embodiment (1), the first video receiver end 300 is, for example, a video receiver that can support the HDR imaging format. Therefore, the video detector 144 of the first video signal converter 140a can read the EDID information of the first video receiver end 300 and determine that the first video receiver end 300 can support the HDR imaging format. Since the second video receiver end 400 is, for example, a video receiver that cannot support the HDR imaging format, the video detector 144 of the second video signal converter 140b can read the EDID information of the second video receiver end 400 and determine that the second video receiver end 400 cannot support the HDR imaging format. In this case, the video detector 144 can generate a conversion command.

Step S205: receiving the conversion command by a video processor. As shown in FIG. 1 and FIG. 3, in the embodiment, in both of the first video signal converter 140a and the second video signal converter 140b, the video detector 144 is electrically coupled to the video processor 145 via a data bus. If the video receiver fails to support the HDR imaging format, the video detector 144 of the video signal converter can generate a conversion command and the video detector 144 can send the conversion command to the video processor 145. According to the exemplary embodiment (1) shown in FIG. 1, the video detector 144 of the second video signal converter 140b can generate the conversion command.

In contrast, according to the exemplary embodiment (1) shown in FIG. 1, since the first video receiver end 300 can support the HDR imaging format, the video detector 144 of the first video signal converter 140a would not generate the conversion command. It is to say, the video processor 145 of the first video signal converter 140a can pass the input signal from the resolution processor 143 to the rear end interface 146 directly. In this way, the first video receiver end 300 being coupled to the rear end interface 146 can receive the input signal directly and display video images corresponding to the input signal. In short, if the video detector 144 determines that the input signal is encoded in the HDR imaging format and the video receiver supports the HDR imaging format, the video processor 145 can pass the input signal to the video receiver directly.

Step S206: converting, by the video processor, the input signal into an output signal corresponding to the SDR imaging format. As shown in FIG. 1 and FIG. 3, in the embodiment, the video processor 145 of the second video signal converter 140b is electrically coupled to the resolution processor 143. After the resolution processor 143 adjusts the resolution of the input signal, the resolution processor 143 can deliver the input signal to the video processor 145 via the image bus. In the embodiment, according to the conversion command, the video processor 145 can convert the input signal into an output signal corresponding to the SDR imaging format.

It is understood that, the arrangement of the steps S201-S207 in the foregoing embodiments are for exemplary purposes. It is noted that, in the exemplary embodiment (3) shown in FIG. 1, step S203 can be unnecessary. In such case, step S204 can be replaced by: in response to the input signal corresponding to the HDR imaging format, generating a conversion command by the image detector.

Figure 4:
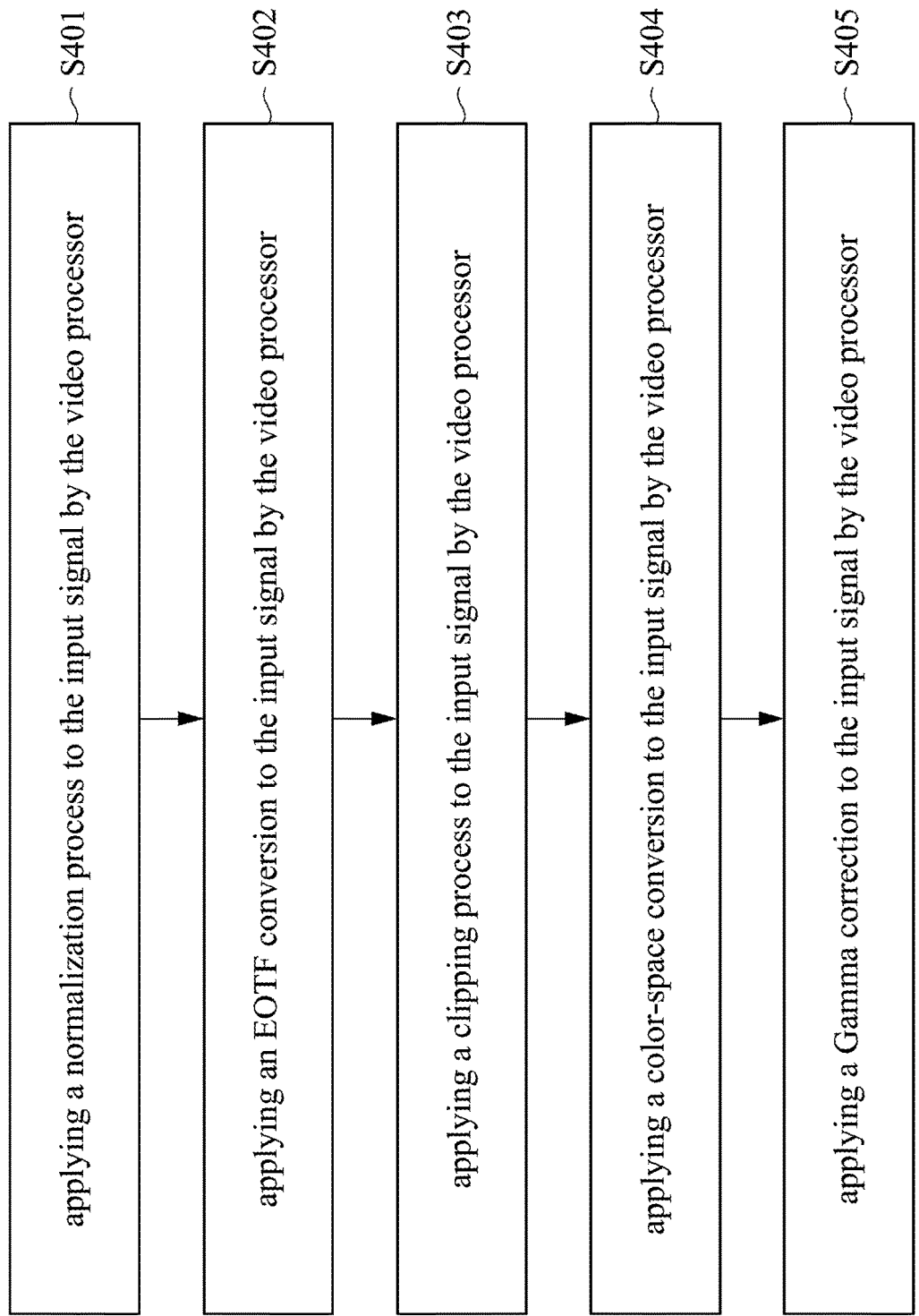
FIG. 4 is a flow chart showing a video signal conversion method according to an embodiment of present disclosure.

To allow for better understandings, reference cam be made to FIG. 4. FIG. 4 is a flow chart showing details steps of the step 206 performed by the video processor 145. The steps in this figure will be introduced in following paragraphs.

Reference is made to FIG. 4. Step S401: applying a normalization process to the input signal by the video processor. In the embodiment, the video processor 145 of the second video signal converter 140b can receive the input signal. The video processor 145 can a normalization process to the input signal according to the conversion command. For example, the video processor 145 can normalize the input signal to adjust the RGB color levels in a range from 0-4095 to in a range from 0-1. In this manner, the brightness of the input signal can be turned to a standard level.

Reference is made to FIG. 4. Step S402: applying an EOTF conversion to the input signal by the video processor. In the embodiment, after the normalization process, the video processor 145 can apply an electro-optical transfer function (EOTF) conversion according to the conversion command. For instance, the video processor 145 can apply the electro-optical transfer function conversion to the input signal based on the HDR standard (e.g. HDR 10 or Dolby Vision, etc.) in order to adjust the brightness distribution curve of the input signal and increase the bit width. In another example, the video processor 145 can apply the electro-optical transfer function conversion to the input signal based on the HLG-HDR standard of BBC/NHK. In this manner, the brightness distribution of the input signal can be adjusted to HLG standard according to a maximum brightness, a minimum brightness and an environment brightness of the second video receiver end 400.

Reference is made to FIG. 4. Step S403: applying a clipping process to the input signal by the video processor. In the embodiment, after the EOTF conversion, the video processor 145 can apply a clipping process according to the conversion command. For example, the video processor can set a color conversion threshold according to the imaging format information of the at least one video metadata. The video processor 145 can apply the clipping process according to color conversion threshold. In this manner, part of the input signal can be clipped. The part being clipped corresponds to a brightness range that can only be displayed in the HDR imaging format but not in the SDR imaging format.

Reference is made to FIG. 4. Step S404: applying a color-space conversion to the input signal by the video processor. In the embodiment, after the clipping process, the video processor 145 can apply a color-space conversion to the input signal according to the conversion command. For instance, the video processor 145 can apply a mapping between a color space of BT 2020 standard and a color space of Rec 709 standard. Such mapping can turn the color space of the input signal from the HDR imaging format to the SDR imaging format.

Reference is made to FIG. 4. Step S405: applying a Gamma correction to the input signal by the video processor. In the embodiment, after the color-space conversion, the video processor 145 can apply a Gamma correction to the input signal according to the conversion command. For instance, to adapt a Gamma curve of the second video receiver end 400, the video processor 145 can process the color-space converted input signal according to Gamma 1.8 or Gamma 2.2 conversion formulas in order to generate the output signals that can match the Gamma curve of the second video receiver end 400.

Step S207: transmitting, by the video processor, the output signal to the video receiver. After the steps S401-S405, the video processor 145 can successfully convert the input signal corresponding to the HDR imaging format into the output signal corresponding to the SDR imaging format. As shown in FIG. 1 and FIG. 3, the video processor 145 is electrically coupled to the rear end interface 146 via an image bus. When the video processor 145 converts the input signal into the output signal according to the conversion command, the video processor 145 can send the output signal to the rear end interface 146 via the image bus. The second video receiver end 400 being coupled to the rear end interface 146 can receive the output signal. In this way, even if the input signal sending from the video source device 200 is encoded in the HDR imaging format, the second video receiver end 400 that fails to support the HDR imaging format, the second video receiver end 400 can still output correct video images without abnormal colors.

In the embodiment, the video processor 145 configured in the first video signal converter 140a and the second video signal converter 140b can be a general processor, a field programmable gate array (FPGA), a complex programmable logic device, etc. In some embodiments, the video processor 145 can be associated with one or more applications so that the video processor 145 can access corresponding instructions from memories and execute these instructions to perform some functions of the video processor 145.

in the embodiment, except the function of video signal conversion, the first video signal converter 140a and the second video signal converter 140b can have a function of video signal recording. For example, the video processor of the first video signal converter 140a and the second video signal converter 140b can send the output signal to a memory to establish the function of video signal recording. It is noted that the first video signal converter 140a and the second video signal converter 140b can be used to record the output signal after being processed by the steps S401-S405 instead of the input signal. In this manner, whether the first video receiver end 300 or the second video receiver end 400 can support the HDR imaging format or not, the first video signal converter 140a and the second video signal converter 140b can record the output signal corresponding to the SDR imaging format while the user of the video receiver sees the correct images.

It is noted that, in some embodiments, the video signal conversion device 100 can be configured with a control interface or a control button. Through the control interface or the control button, the user can enable/disable the first video signal converter 140a and the second video signal converter 140b in the video signal conversion device 100 to apply the video conversion process. The other way around, present disclosure provides a mechanism for the user to control the device. Whether the first video receiver end 300 or the second video receiver end 400 can (or cannot) support the HDR imaging format, the user can enable/disable the first video signal converter 140a and the second video signal converter 140b manually to control the video conversion process.

It is understood that prior arts usually ignore whether the video receiver at the rear end can (or cannot) support the HDR imaging format. It can bring terrible experiences to both the users of the video receiver and the audiences of the live broadcast. In contrast, the video signal conversion device and the video signal conversion method of present disclosure can determine whether the front end and the rear end are compatible in the imaging formats, in order to display or record output signals without abnormal colors. It is proved that the approach of present disclosure can provide better efficiencies than the prior arts. The approach of present disclosure can be applied in the field of video/audio entertainment, such as live broadcast, to provide the users and the audiences with better experiences.

Various functional components or blocks have been described herein. As will be appreciated by persons skilled in the art, in some embodiments, the functional blocks will preferably be implemented through circuits (either dedicated circuits, or general purpose circuits, which operate under the control of one or more processors and coded instructions), which will typically comprise transistors or other circuit elements that are configured in such a way as to control the operation of the circuity in accordance with the functions and operations described herein. As will be further appreciated, the specific structure or interconnections of the circuit elements will typically be determined by a compiler, such as a register transfer language (RTL) compiler. RTL compilers operate upon scripts that closely resemble assembly language code, to compile the script into a form that is used for the layout or fabrication of the ultimate circuitry. Indeed, RTL is well known for its role and use in the facilitation of the design process of electronic and digital systems.

Although the present disclosure has been described in considerable detail with reference to certain embodiments thereof, other embodiments are possible. It will be apparent to those skilled in the art that various modifications and variations may be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A video signal conversion device, comprising:
a splitter, configured to split an input signal sending from a video source into a first path of the input signal and a second path of the input signal, wherein the splitter is electrically coupled to the video source device;
a front end interface configured to receive the first path of the input signal from the splitter;
a rear end interface, coupled to a first video receiver;
a video detector, coupled between the front end interface and the rear end interface, the video detector configured to extract an image metadata from the first path of the input signal, to determine whether the first path of the input signal corresponds to a high dynamic range (HDR) imaging format according to at least one format data of the image metadata and determine whether the first video receiver supports the high dynamic range imaging format, and to generate a conversion command in response to the first path of the input signal corresponding to the high dynamic range imaging format and the first video receiver being not support the high dynamic range imaging format; and
a video processor, coupled to the front end interface, the rear end interface and the video detector, wherein the video processor receives the conversion command, the video processor is configured to convert the first path of the input signal generated from the splitter into an output signal corresponding to a standard dynamic range (SDR) imaging format according to the conversion command, and to send the output signal to the first video receiver via the rear end interface,
wherein the first video receiver receives the output signal and stores the output signal in SDR imaging format,
wherein a second video receiver receives the second path of the input signal.

2. The video signal conversion device of claim 1, wherein the video processor is configured to convert the first path of the input signal into the output signal corresponding to the standard dynamic range format according to the at least one format data.

3. The video signal conversion device of claim 2, wherein the video processor is configured to set a color conversion threshold according to the at least one format data and convert the first path of the input signal into the output signal to fit a gamut of the standard dynamic range format according to the color conversion threshold, in order to generate the output signal.

4. The video signal conversion device of claim 1, wherein the video processor is further configured to store the output signal in a memory.

5. A video signal conversion method, comprising:
splitting, by a splitter, an input signal sending from a video source into a first path of the input signal and a second path of the input signal, wherein the splitter is electrically coupled to the video source device;
receiving, by a video detector, the first path of the input signal;
extracting, by the video detector, an image metadata from the first path of the input signal;
determining, by the video detector, whether the first path of the input signal corresponds to a high dynamic range (HDR) imaging format according to at least one format data of the image metadata and determining, by the video detector, whether a first video receiver supports the high dynamic range imaging format;
in response to the first path of the input signal corresponding to the high dynamic range imaging format and the first video receiver being not support the high dynamic range imaging format, generating a conversion command by the video detector;
receiving, by a video processor, the conversion command;
converting, by the video processor, the first path of the input signal generated from the splitter into an output signal corresponding to a standard dynamic range (SDR) imaging format according to the conversion command;
sending, by the video processor, the output signal to a first video receiver;
receiving and storing, by the first video receiver, the output signal in SDR imaging format; and
receiving, by a second video receiver, the second path of the input signal.

6. The video signal conversion method of claim 5, further comprising:

converting, by the video processor, the first path of the input signal into the output signal corresponding to the standard dynamic range format according to the at least one format data.

7. The video signal conversion method of claim 6, further comprising:
setting, by the video processor, a color conversion threshold according to the at least one format data; and
converting, by the video processor, the first path of the input signal into the output signal to fit a gamut of the standard dynamic range format according to the color conversion threshold, in order to generate the output signal.

8. The video signal conversion method of claim 5, further comprising:
storing, by the video processor, the output signal in a memory.

9. The video signal conversion device of claim 1, wherein the first video receiver has at least one first video function, the first video receiver executes the at least one first video function based on the output signal, and the at least one first video function is a storage function, a live broadcast function, or a video editor function,
wherein the second video receiver has at least one second video function, the second video receiver executes the at least one second video function based on the second path of the input signal, and the at least one second video function is a storage function, a live broadcast function, or a video editor function.

10. The video signal conversion device of claim 9, wherein the first video function is different from the second video function.

11. The video signal conversion device of claim 1, wherein the video signal conversion device passes through the second path of the input signal generated from the splitter without conversion between the HDR imaging format and the SDR imaging format into the second video receiver while the video processor converts the first path of the input signal generated from the splitter into the output signal corresponding to the standard dynamic range imaging format.

12. The video signal conversion method of claim 5, wherein the first video receiver has at least one first video function, the first video receiver executes the at least one first video function based on the output signal, the at least one first video function is a storage function, a live broadcast function, or a video editor function,
wherein the second video receiver has at least one second video function, the second video receiver executes the at least one second video function based on the second path of the input signal, and the at least one second video function is a storage function, a live broadcast function, or a video editor function, wherein the at least one first video function is different from the at least one second video function.

13. The video signal conversion method of claim 5, further comprising:
passing through the second path of the input signal without conversion between the HDR imaging format and the SDR imaging format into the second video receiver while the video processor converts the first path of the input signal generated from the splitter into the output signal corresponding to the standard dynamic range imaging format.

14. The video signal conversion device of claim 1, further comprising:
a resolution processor, electrically coupled the video processor via an image bus, wherein after the resolution processor adjusts resolution of the first path of the input signal, the resolution processor delivers the first path of the input signal to the video processor via the image bus.

15. The video signal conversion device of claim 14, wherein the resolution processor is configured to convert the input signal into video signals in some specific resolutions according to a user demand.

16. The video signal conversion device of claim 1, further comprising:
a HDMI receiver, wherein the rear end interface receives the first path of the input signal and redirects the first path of the input signal to the HDMI receiver; and
a resolution processor, wherein the HDMI receiver delivers the first path of the input signal to the resolution processor via an image bus for subsequent processing by the resolution processor.

17. The video signal conversion method of claim 5, further comprising:
adjusting, by a resolution processor, resolution of the first path of the input signal; and
after the resolution processor adjusts the resolution of the first path of the input signal, delivering, by the resolution processor, the first path of the input signal to the video processor via an image bus.

18. The video signal conversion method of claim 17, wherein the resolution processor is configured to convert the input signal into video signals in some specific resolutions according to a user demand.

19. The video signal conversion method of claim 5, further comprising:
receiving, by the rear end interface, the first path of the input signal and redirecting the first path of the input signal to a HDMI receiver; and
delivering, by the HDMI receiver, the first path of the input signal to a resolution processor via an image bus for subsequent processing by the resolution processor.

* * * * *